(12) United States Patent
Madsen

(10) Patent No.: US 11,470,979 B1
(45) Date of Patent: Oct. 18, 2022

(54) BED-FLOOR GAP BUMPER

(71) Applicant: Melody Madsen, Rio Rancho, NM (US)

(72) Inventor: Melody Madsen, Rio Rancho, NM (US)

(*) Notice: Subject to any disclaimer, the term of this patent is extended or adjusted under 35 U.S.C. 154(b) by 0 days.

(21) Appl. No.: 17/699,123

(22) Filed: Mar. 20, 2022

(51) Int. Cl.
*A47C 21/00* (2006.01)
*A01M 29/30* (2011.01)
*A47C 19/22* (2006.01)

(52) U.S. Cl.
CPC ............ *A47C 21/00* (2013.01); *A01M 29/30* (2013.01); *A47C 19/22* (2013.01)

(58) Field of Classification Search
CPC ......... A47C 21/00; A47C 19/22; A01M 29/30
USPC .............................................. 5/658, 424, 924
See application file for complete search history.

(56) References Cited

U.S. PATENT DOCUMENTS

| 4,924,644 | A | * | 5/1990 | Lewis | E04B 7/22 52/747.11 |
| 5,669,089 | A | * | 9/1997 | Dees | B25H 5/00 5/722 |
| 5,754,996 | A | * | 5/1998 | VanSwearingen | A47C 21/028 5/503.1 |
| 7,805,781 | B1 | * | 10/2010 | Smith | A47C 17/86 5/663 |
| D663,557 | S | * | 7/2012 | Marler | D6/716 |
| 8,465,101 | B1 | * | 6/2013 | Alvarez | A47B 97/00 297/463.2 |
| D779,679 | S | * | 2/2017 | Sartain | D25/48.5 |
| 9,675,181 | B2 | * | 6/2017 | Caron | A47C 17/86 |
| D792,143 | S | * | 7/2017 | Caron | D6/719 |
| D792,144 | S | * | 7/2017 | Caron | D6/719 |
| 10,258,168 | B2 | * | 4/2019 | Cerri, III | A47C 27/087 |
| 10,462,277 | B2 | * | 10/2019 | Lee | H04M 1/05 |
| 11,206,933 | B2 | * | 12/2021 | Serenson | A47D 15/00 |
| 2012/0315434 | A1 | * | 12/2012 | Marler | A47C 17/86 428/121 |
| 2016/0100695 | A1 | * | 4/2016 | Harris | A47C 31/00 428/12 |
| 2016/0220029 | A1 | * | 8/2016 | Caron | A47C 17/86 |
| 2017/0290445 | A1 | * | 10/2017 | Cerri, III | A47D 15/00 |
| 2019/0191892 | A1 | * | 6/2019 | Cerri, III | A47D 15/00 |
| 2019/0261784 | A1 | * | 8/2019 | Serenson | A47C 19/22 |

* cited by examiner

Primary Examiner — Robert G Santos
(74) Attorney, Agent, or Firm — Alexander Postnikov

(57) ABSTRACT

A bumper designed to block a gap in between a bed and the floor, preventing household items, pets, and children from going into the space underneath beds, and, thus, eliminating messes, damage, injury, or loss. The bumper may be made of corrugated paper, heavy paperboard, or cardboard. The bumper may comprise a flat, rectangular body segmented into flat, rectangular sections using parallel folds, where the sections are configured to secure the bumper in between the bed and the floor. The bumper is setback from the bedframe perimeter to not be obtrusive, strong enough to resist inward pressure, and, in some embodiments, may contain markings to indicate triangular truncations. A plurality of bumpers may, through a series of truncations, be customized to fully block access to the space underneath the bed for variety of bed lengths, widths, and heights.

12 Claims, 6 Drawing Sheets

BED-FLOOR GAP BUMPER

BACKGROUND

Field of the Invention

The present invention relates generally to furniture bumpers, and, in particular, to bumpers that block the gap in between a bed and the floor.

Scope of the Prior Art

Many beds have a gap in between the bed and the floor. Toys and other household items can roll through this gap and get stuck. Pets often relieve themselves in the space beneath beds and cause scratching damage to the underside of box springs. Babies and children can get trapped or injured while searching for toys or exploring the space underneath beds.

Many solutions to keep household items, pets, and children from going into the space underneath beds have been put forth in the prior art. Some of these include:

Interconnectable rigid PVC or resin panels. Such panels, placed along an outer perimeter of a bedframe, can block the bed-floor gap. However, their out-in-the-open placement is aesthetically displeasing and can result in many stubbed toes while climbing into bed. Furthermore, the panels have a fixed length and geometry, limiting customization and rendering them unsuitable for many bedding arrangements. Connecting multiple panels to span a length of the bed creates multiple points of failure.

Elastic fabrics. Such fabrics, stretched along an outer perimeter of a bedframe, can block the bed-floor gap. However, they lack durability, require constant readjustment, do not provide an evenly taut surface across the length of the installation, and lack the strength to keep out pets and children.

Repurposed cushions, pillows, and the like. Such soft objects, placed along an outer perimeter of a bedframe, can block the bed-floor gap. However, their random geometries may result in an aesthetically displeasing look and leaves obvious gaps. Furthermore, the soft objects can be easily knocked over or removed by pets and children.

These prior art solutions, to effectively block the bed-floor gap, must be fixed in place to the floor, to bedframe edges, or to bedposts. This may require using unaesthetic and less-than-durable fastening methods such double sided tape, connectors, zip ties, and the like. Such methods also damage surroundings and are particularly ineffective on carpeted surfaces.

What is needed is a universal bed gap bumper that is sturdy, hidden, aesthetically pleasing, adjustable to fit a wide variety of bedding arrangements, and effective at completely blocking access to the space underneath beds.

SUMMARY

The present disclosure satisfies the foregoing needs by providing, inter alia, a bumper for addressing each of the foregoing desirable traits as well as methods of its use.

One aspect of the present invention is directed at a bumper to block a gap in between the bottom of the bed and the floor. The bumper may comprise a flat, rectangular body segmented into flat, rectangular sections using parallel folds. A first section may be configured to lie horizontally on the floor. A second section may be configured to extend upwards. A third section may be configured to lie horizontally in between a slat railing and the slats. A fourth section may be configured to lie vertically in between a bedframe and the slat ends.

The body may be made of one of corrugated paper, heavy paperboard, and/or cardboard. The height of the bumper may be adjusted by changing the angle in between the second section and the floor. Preferably, the angle is 45 degrees. The length of the body may be adjusted by truncating an end portion of the body. Preferably, the length of the body is substantially equal to the length of the associated slat railing less the width of the third section of a bumper on the footboard side of the bed.

At least one end portion of the body may have markings to indicate triangular truncations. Alternatively, instructions to create the necessary truncations will be provided.

The bumper may further comprise a fifth section configured to lie horizontally on top of the slats.

This arrangement of bumper sections creates vertical strength through angled pressure between the bottom of the slats and the floor, which inherently generates resistance to inward pressure. Furthermore, various bedframe heights can be accommodated by simply adjusting the angle of the second segment and the size of the triangular truncation on the foot board ends of bumpers.

The inwards extension of the bumper makes it virtually invisible from within the room and prevents a user from stubbing a toe as he or she approaches the bed. The bumper is conveniently secured in place due to its incorporation into the existing structure of the bed.

BRIEF DESCRIPTION OF THE DRAWINGS

The foregoing summary, as well as the following detailed description of preferred variations of the invention, will be better understood when read in conjunction with the appended drawings. For the purpose of illustrating the invention, there is shown in the drawings variations that are presently preferred. It should be understood, however, that the invention is not limited to the precise arrangements shown. In the drawings, where.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to any single implementation or implementations. Wherever convenient, the same reference numbers will be used throughout the drawings to refer to same or like parts.

Moreover, while variations described herein are primarily discussed in the context blocking a gap in between a bed and the floor, it will be recognized by those of ordinary skill that the present disclosure is not so limited. In fact, the principles of the present disclosure described herein may be readily applied to blocking gaps in between other furniture pieces and the floor.

In the present specification, an implementation showing a singular component should not be considered limiting; rather, the disclosure is intended to encompass other implementations including a plurality of the same component, and vice-versa, unless explicitly stated otherwise herein. Further, the present disclosure encompasses present and future known equivalents to the components referred to herein by way of illustration.

It will be recognized that while certain aspects of the technology are described in terms of a specific sequence of steps of a method, these descriptions are only illustrative of the broader methods of the disclosure and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

Now referring to FIGS. 1a-1c, one exemplary bumper 100 is illustrated and described in detail below. This bumper 100 is ideal for use on side portions of a bedframe.

Figure 1A:
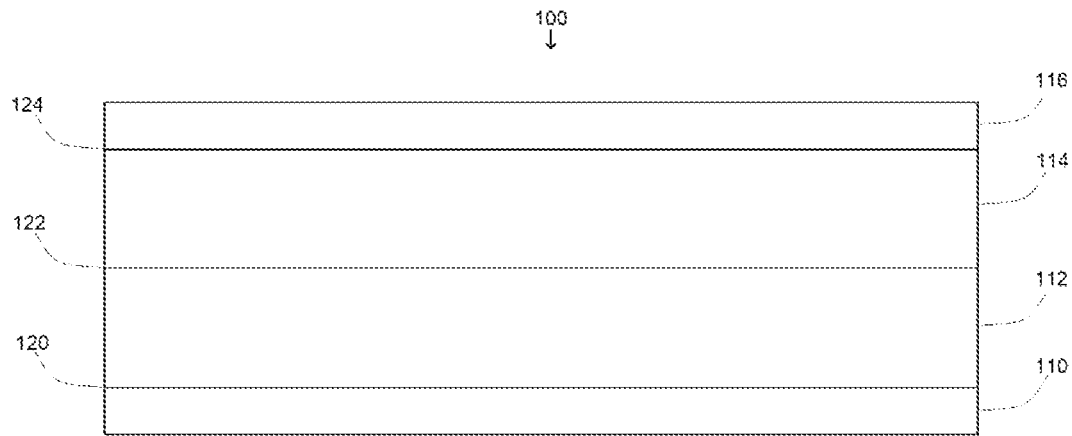
FIG. 1*a* is a front view of a bumper in its unfolded configuration, according to one embodiment of the present invention.

FIG. 1a shows the bumper 100 in its unfolded configuration from a front view. The unfolded bumper is flat and rectangular. Three parallel fold lines run across the bumper. The fold lines may be perforations and/or creases in the bumper body.

Figure 1B:
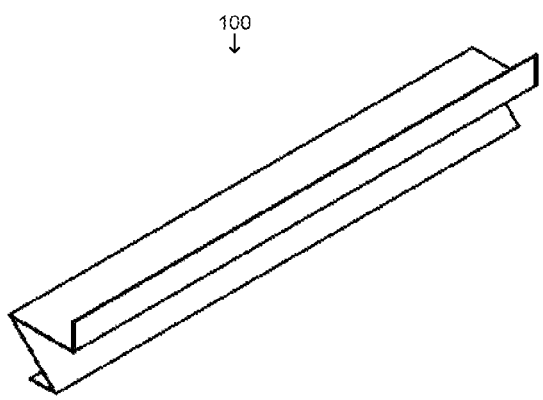
FIG. 1*b* is a perspective view of the bumper of FIG. 1*a* in its folded configuration, according to one embodiment of the present invention.

FIG. 1b shows the bumper 100 in its folded configuration from a perspective view. The bumper is folded along the three parallel fold lines, resulting in four flat, rectangular sections.

Figure 1C:
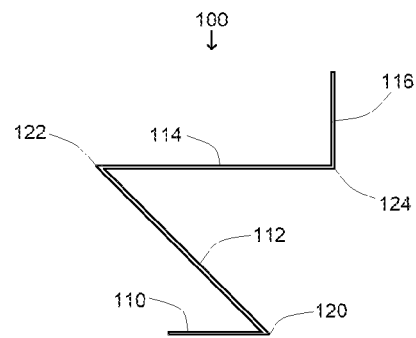
FIG. 1*c* is a left-side view of the bumper of FIG. 1*a* in its folded configuration, according to one embodiment of the present invention.

FIG. 1c shows the bumper in its folded configuration from a left-side view. The first section 110 is horizontal. The first section is configured to contact the floor in the space underneath a bed. The second section 112, connected to the first section 110 along the first fold 120, is configured to extend upwards at angle α. The third section 114, connected to the second section 112 along the second fold 122, is horizontal. The third section 114 is configured to lie in between a slat railing and slats. The fourth section 116, connected to the third section 112 along the third fold 124, is vertical. The fourth section 116 is configured to lie in between a bedframe and slats.

Figure 2A:
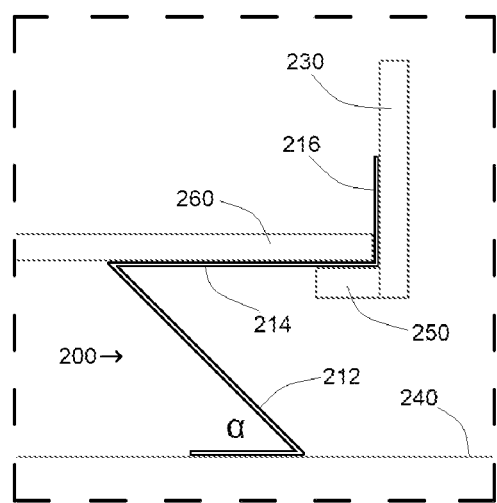
FIG. 2*a* is a left-side cross-sectional view of the bumper of FIG. 1*c*, positioned to block the gap in between a bed and the floor, according to one embodiment of the present invention.

Now referring to FIG. 2a, the bumper of FIG. 1a is positioned to block a gap in between a side portion of a bedframe 230 and the floor 240.

FIG. 2a shows the bumper 200 in its folded configuration, from a left-side cross-sectional view. The third section 214 rests in between the top surface of the slat railing 250 and the bottom surfaces of the slats 260. The fourth section 216 rests in between the inner surface of the bedframe 230 and the outer surfaces of the slats 260. The non-parallel arrangement of the third and fourth sections, as well as the pressure exerted by the weight of the slats 260, keeps the bumper 200 firmly in place. Here, angle α, the angle in between the second section 212 and the floor 240, is 45 degrees, ideal for standard height bedframes. Angle α can be adjusted to enable the bumper to fit higher or lower bedframes.

Figure 2B:
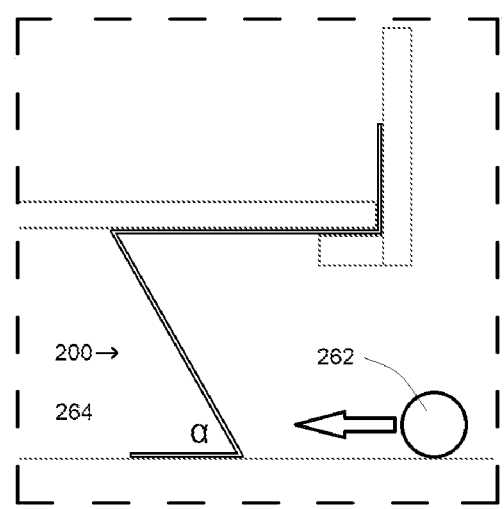
FIG. 2*b* is a left-side cross-sectional view of the bumper of FIG. 2*a*, where the angle between the second section and the floor has been increased.

FIG. 2b shows the bumper of FIG. 2a adjusted to fit a higher bedframe. Here, angle α is approximately 60 degrees. The bumper 200 blocks objects 262 from going into the space 264 underneath the bed.

Now referring to FIGS. 3a-3c, a second exemplary bumper 300 is illustrated and described in detail below. This bumper 300 is ideal for use along headboard and footboard portions of the bedframe that do not have a slat rail. This bumper is identical to the bumper of FIGS. 1a-1c but further comprises a fourth parallel fold 326 and a fifth section 318.

Figure 3A:
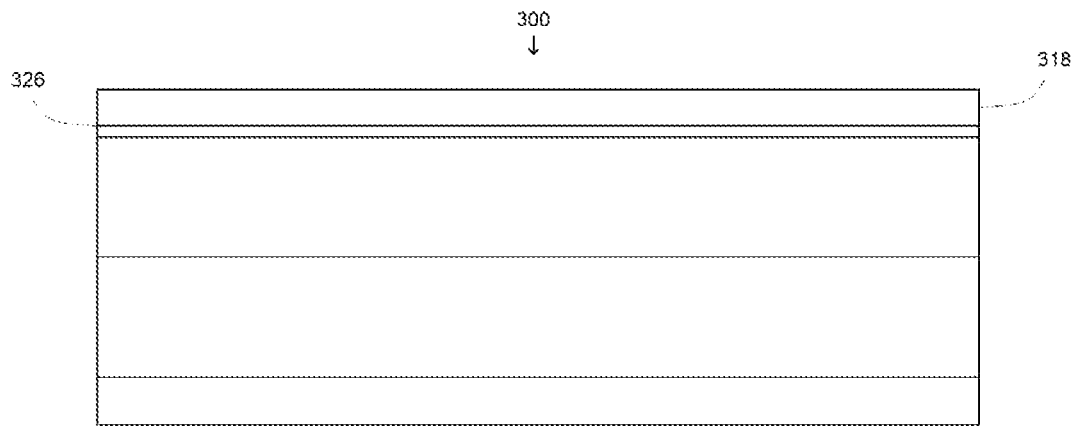
FIG. 3*a* is a front view of a bumper in its unfolded configuration, according to a second embodiment of the present invention.
Figure 3B:
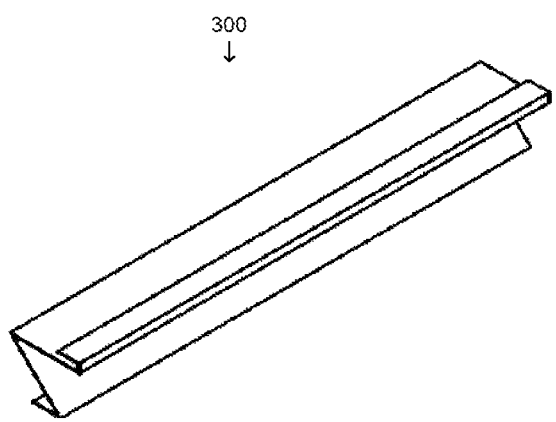
FIG. 3*b* is a perspective view of the bumper of FIG. 3*a* in its folded configuration, according to a second embodiment of the present invention.
Figure 3C:
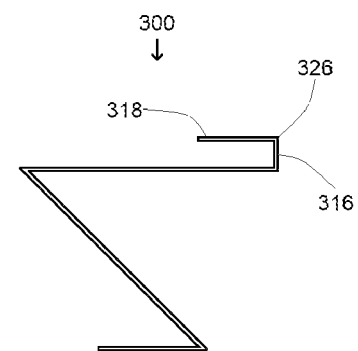
FIG. 3*c* is a left-side view of the bumper of FIG. 3*a* in its folded configuration, according to a second embodiment of the present invention.

FIG. 3a shows the bumper 300 in its unfolded configuration from a front view. FIG. 3b shows the bumper 300 in its folded configuration from a perspective view. FIG. 3c shows the bumper 300 in its folded configuration from a left-side view. The fifth section 318, connected to the fourth section 316 along the fourth parallel fold 326, is horizontal. The fifth section 318 is configured to lie on top of slats.

Figure 4A:
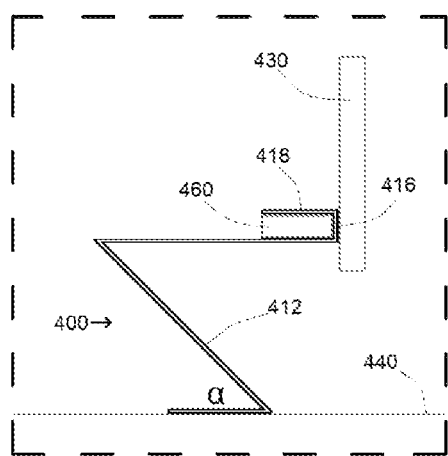
FIG. 4a is a left-side cross-sectional view of the bumper of FIG. 3c, positioned to block the gap between a bed and the floor, according to a second embodiment of the present invention.

Now referring to FIG. 4a, the bumper of FIG. 3a is positioned to block a gap in between a footboard portion of the bedframe 430 and the floor 440.

FIG. 4a shows the bumper 400 in its folded configuration, from a left-side cross-sectional view. The fourth section 416 rests in between the inner surface of the bedframe 430 and the outer surfaces of the slats 460. The fifth section 418 rests on the top surface of the slats 460. The non-parallel arrangement of the fourth and fifth sections keeps the bumper 400 firmly in place. Here, angle α, the angle in between the second section 412 and the floor 440 is 45 degrees, ideal for standard height bedframes. Angle α can be adjusted to enable the bumper to fit higher or lower bedframes.

Figure 4B:
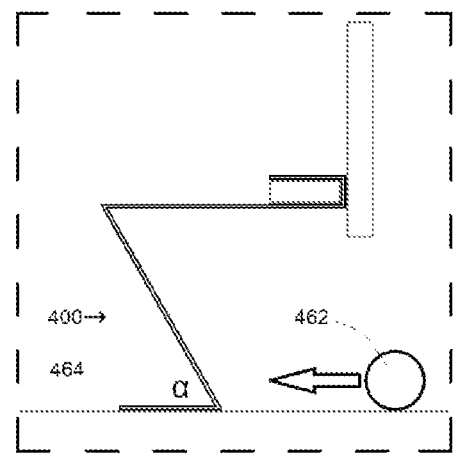
FIG. 4b is a left-side cross-sectional view of the bumper of FIG. 4a, where the angle between the second section and the floor has been increased.

FIG. 4b shows the bumper of FIG. 4a adjusted to fit a higher bedframe. Here, angle α is approximately 60 degrees. The bumper 400 blocks objects 462 from going into the space 464 underneath the bed.

Figure 5A:
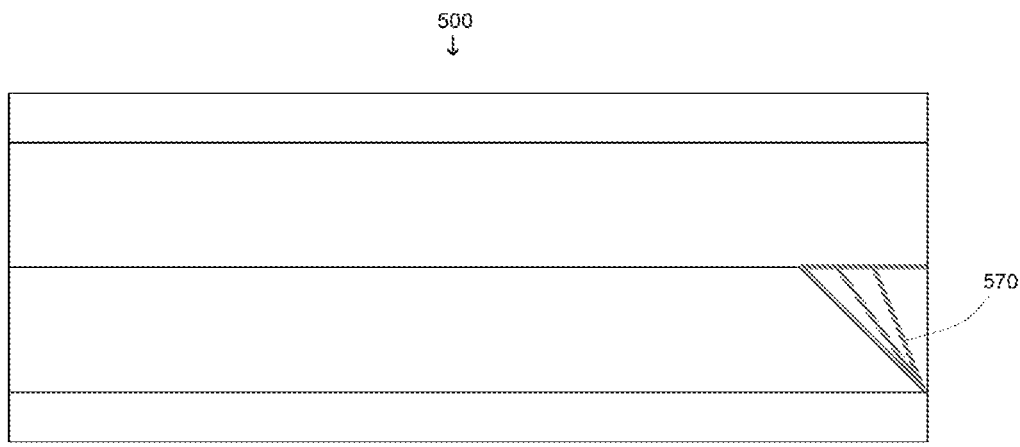
FIG. 5a is a front view of the bumper of FIG. 1a in its unfolded configuration, where several sets of markings are present to indicate triangular truncations.
Figure 5B:
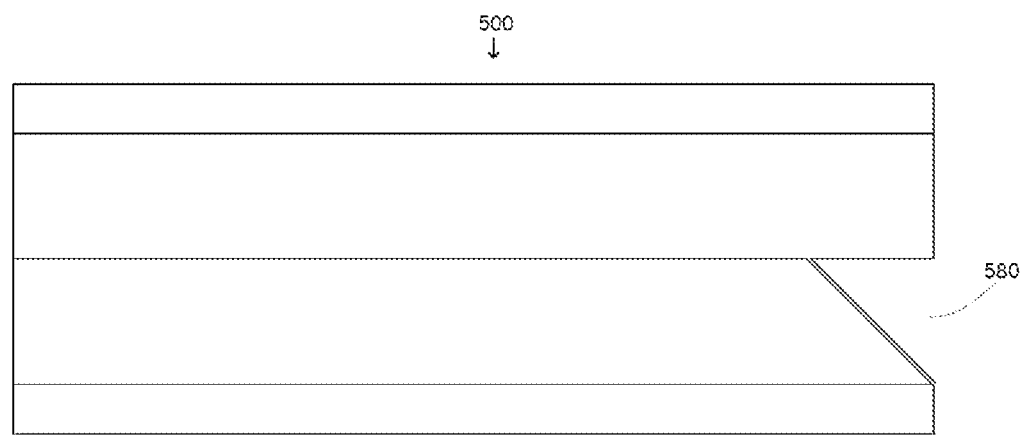
FIG. 5b is a front view of the bumper of FIG. 5a, where a user has cut along one set of markings to create a triangular truncation.

Bumpers may have at least one set of markings on one or both end portions to indicate triangular truncations. Such markings may be printed, or otherwise applied, onto the body of the bumper, where each set of markings indicates the specific triangular truncation required for a certain bedframe height. Alternatively, instructions for how to create these triangular truncations may be includes with the install instructions. For example, FIG. 5a shows the bumper of FIG. 1a, where several dashed lines 570 are printed onto the body of the bumper 500. FIG. 5b shows the bumper 500 of FIG. 5a, where a user has cut across one of the dashed lines 570, truncating the end portion 580.

Figure 6:
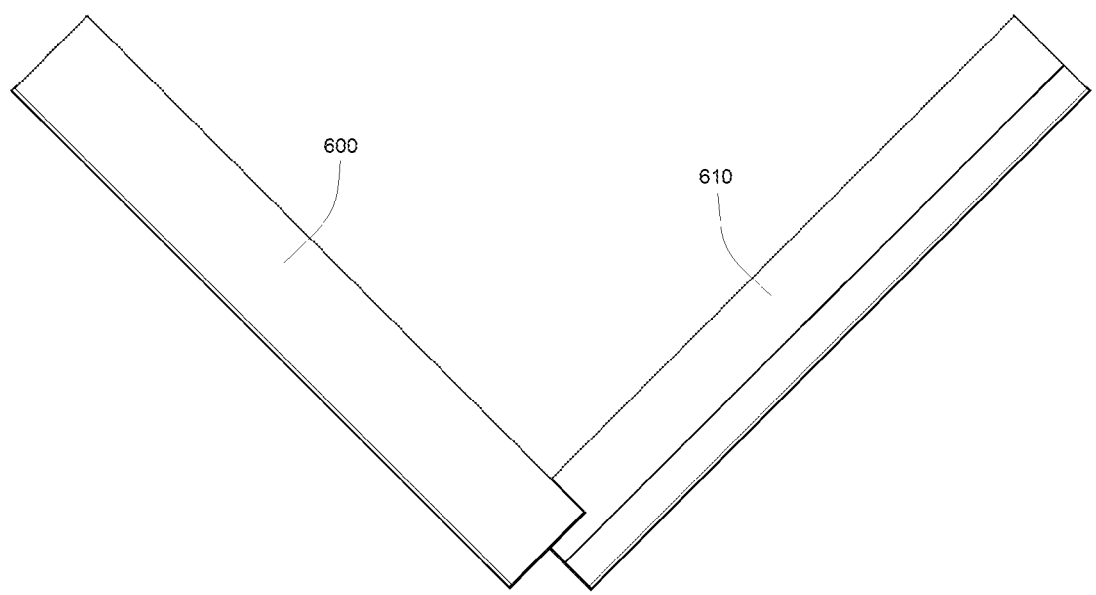
FIG. 6 is a top view of two perpendicular bumpers where the truncated end portions are overlapped.

Bumpers with truncated end portions may be arranged perpendicular to each other. For example, FIG. 6 shows a top view of a bumper for a side portion 600 (such as in FIGS. 1b-1c) arranged perpendicular to a bumper for a footboard portion 610 (such as in FIGS. 3b-3c). The end portions of each bumper have been truncated, allowing the bumpers to overlap with each other, covering any corner gaps. According to an embodiment, truncated end portions may be fastened together using tape, adhesives, and the like to improve rigidity.

Bumpers may be substantially made of corrugated paper, heavy paperboard, or cardboard. In yet another alternative embodiment, bumpers may be substantially made of any material that is durable and that can be folded into segments.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the principles of the disclosure. This description is in no way meant to be limiting, but rather should be taken as illustrative of the general principles of the technology. The scope of the disclosure should be determined with reference to the claims.

I claim:

1. A bumper to block a gap in between a bed and flooring, the bed comprising a bedframe which includes a slat railing, a plurality of slats and a footboard panel, the bumper comprising:
 a flat, rectangular body segmented into flat, rectangular sections using parallel folds, wherein
  a first section is configured to lie horizontally on the flooring;
  a second section, connected to the first section along a first parallel fold, is configured to extend upwards;
  a third section, connected to the second section along a second parallel fold, is configured to lie horizontally in between a top surface of the slat railing and bottom surfaces of the slats; and
  a fourth section, connected to the third section along a third parallel fold, is configured to lie vertically in between an inner surface of the bedframe and outer surfaces of the slats.

2. The bumper of claim 1, wherein the body is made of one of cut-to-size corrugated paper, heavy paperboard, and cardboard.

3. The bumper of claim 1, wherein a height of the bumper is adjusted by one of increasing and decreasing an angle in between the second section and the flooring.

4. The bumper of claim 1, wherein an angle in between the second section and the flooring is approximately 45 degrees.

5. The bumper of claim 1, wherein a length of the body is adjusted by truncating an end portion of the body.

6. The bumper of claim 1, wherein a first length of the body is substantially equal to a second length of an associated slat railing less a width of the footboard panel.

7. The bumper of claim 1, wherein at least one end portion of the body has markings to indicate triangular truncations.

8. A bumper to block a gap in between a bed and flooring, the bed comprising a bedframe which includes a plurality of slats, the bumper comprising:
 a flat, rectangular body segmented into flat, rectangular sections using parallel folds, wherein
  a first section is configured to lie horizontally on the flooring;
  a second section, connected to the first section along a first parallel fold, is configured to extend upwards;
  a third section, connected to the second section along a second parallel fold, is configured to lie horizontally underneath a bottom surface of a last slat;
  a fourth section, connected to the third section along a third parallel fold, is configured to lie vertically in between an inner surface of the bedframe and an outer surface of the last slat;
  a fifth section, connected to the fourth section along a fourth parallel fold, is configured to lie horizontally on a top surface of the last slat.

9. The bumper of claim 8, wherein the body is made of one of cut-to-size corrugated paper, heavy paperboard, and cardboard.

10. The bumper of claim 8, wherein at least one end portion of the body has markings to indicate triangular truncations.

11. The bumper of claim 8, wherein a height of the bumper is adjusted by one of increasing and decreasing an angle in between the second section and the flooring.

12. The bumper of claim 8, wherein an angle in between the second section and the flooring is approximately 45 degrees.

* * * * *